United States Patent
Enthed

(10) Patent No.: US 12,125,092 B2
(45) Date of Patent: Oct. 22, 2024

(54) PRODUCT QUALITY INSPECTION SYSTEMS AND METHODS

(71) Applicant: Inter IKEA Systems B.V., Delft (NL)

(72) Inventor: Martin Enthed, Älmhult (SE)

(73) Assignee: Inter IKEA Systems B.V., Delft (NL)

( * ) Notice: Subject to any disclaimer, the term of this patent is extended or adjusted under 35 U.S.C. 154(b) by 331 days.

(21) Appl. No.: 17/146,957

(22) Filed: Jan. 12, 2021

(65) Prior Publication Data

US 2022/0222727 A1 Jul. 14, 2022

(51) Int. Cl.
*G06Q 30/00* (2023.01)
*G06F 3/16* (2006.01)
*G06Q 30/0601* (2023.01)

(52) U.S. Cl.
CPC ......... *G06Q 30/0627* (2013.01); *G06F 3/167* (2013.01); *G06Q 30/0621* (2013.01); *G06Q 30/0633* (2013.01)

(58) Field of Classification Search
CPC ...... G06Q 30/0601–0645; G06Q 30/08; G06F 3/167
USPC .................................. 705/26.1–27.2
See application file for complete search history.

(56) References Cited

U.S. PATENT DOCUMENTS

| | | |
|---|---|---|
| 9,891,884 B1 | 2/2018 | Baughman et al. |
| 9,911,240 B2 | 3/2018 | Bedikian et al. |
| 2005/0015312 A1* | 1/2005 | Hoffman ................ G06Q 30/02 705/26.5 |
| 2011/0316793 A1* | 12/2011 | Fushiki ................ G10H 1/0575 715/810 |
| 2015/0379168 A1* | 12/2015 | Galore ............... G06Q 30/0643 703/6 |
| 2017/0330539 A1* | 11/2017 | Little .................... G10H 1/0066 |
| 2018/0005312 A1* | 1/2018 | Mattingly ........... G06F 3/04815 |
| 2018/0293804 A1 | 10/2018 | Lotto |
| 2019/0373395 A1 | 12/2019 | Sarkar |
| 2020/0066042 A1 | 2/2020 | Marsh |
| 2020/0296532 A1 | 9/2020 | Wang et al. |
| 2020/0320606 A1* | 10/2020 | Sandow ............. G06Q 30/0629 |
| 2021/0020315 A1* | 1/2021 | Stone ..................... G16H 50/20 |

(Continued)

FOREIGN PATENT DOCUMENTS

| | | |
|---|---|---|
| CN | 109550248 A | 4/2019 |
| WO | 2018/005219 A1 | 1/2018 |
| WO | 2019/036773 A1 | 2/2019 |

OTHER PUBLICATIONS

Militaru, Alice, IKEA, ASMR: The sounds of thread count, Mar. 5, 2020, The Daily Targum, accessed at [https://dailytargum.com/article/2020/03/ikea-asmr-story] (Year: 2020).*

(Continued)

*Primary Examiner* — Jeffrey A. Smith
*Assistant Examiner* — Lindsey B Smith
(74) *Attorney, Agent, or Firm* — Merchant & Gould P.C.

(57) ABSTRACT

Methods and systems for a product quality inspection system. In one aspect, a method of conveying a quality of a furnishing with an e-commerce system is disclosed. The method includes presenting with the e-commerce system a listing for a furnishing, receiving an audio playback request, and presenting in response to the audio playback request an audio recording of an interaction with the furnishing. Where the audio recording is indicative of a material composition of the furnishing.

19 Claims, 10 Drawing Sheets

(56) References Cited

U.S. PATENT DOCUMENTS

2021/0067750 A1* 3/2021 Sandow ................... G06T 7/73
2021/0097599 A1* 4/2021 Sandow ................. G06F 16/54

OTHER PUBLICATIONS https://www.kitchenplanner.ikea.com/us/UI/Pages/VPUI.htm—1 page, retrieved Apr. 21, 2021—Known Prior Art.
https://www.tonepedia.com/player#/electric/effect—1 page, retrieved Apr. 21, 2021—Known Prior Art.
Office Action dated Sep. 15, 2023 for corresponding U.S. Appl. No. 17/482,694 (40 pages).
PCT International Search Report and Written Opinion for PCT/EP2022/050458 mailed on May 4, 2022 (12 pages).
Lee, Dami, Ikea's 25-minute ASMR commercial is the most satisfying way to shop for furniture, Aug. 9, 2017, The Verge, accessed at [https ://www.theverge.com/2017 /8/9/16120624/i kea-asmr-commercial-oddly-youtube] (Year: 2017).

* cited by examiner

PRODUCT QUALITY INSPECTION SYSTEMS AND METHODS

BACKGROUND

Products are often purchased in stores after a customer inspects the item. In many examples the customer may view the product being sold or may view a demo product. It is common for a customer to interact with such a product and make assessments about the quality of a material based on the interaction.

Products are also often purchased online. A customer may view a product on an e-commerce application including pictures and reviews of a product. After viewing the product, the customer can decide on whether they wish to purchase the item based on the information received.

SUMMARY

In general terms, this disclosure is directed to a product quality inspecting system. In some embodiments, and by non-limiting example, the product quality inspection system is part of an e-commerce system. The product quality inspection system presents an audio recording for playback to the user, wherein the audio recording is of an interaction with a furnishing, and is indicative of a material composition of the furnishing, such as to enable the user to inspect a quality of the furnishing.

One aspect is a method of conveying a quality of a furnishing with an e-commerce system is disclosed. The method includes presenting with the e-commerce system a listing for a furnishing, receiving an audio playback request, and presenting in response to the audio playback request an audio recording of an interaction with the furnishing. Where the audio recording is indicative of a material composition of the furnishing.

Another aspect is a method of online shopping. The method includes receiving an e-commerce user-interface including an identification of a furnishing and an audio playback user actuatable element, selecting the audio user actuatable element; and receiving an audio recording of an interaction with the furnishing. Where the audio recording conveys a material composition of the furnishing.

A further aspect is an e-commerce system is disclosed. The e-commerce system includes one or more processors and one or more storage devices. The one or more memory storage devices storing data instructions that, when executed by the one or more processors, cause the one or more processors to: present with the e-commerce system a listing for a furnishing, receive an audio playback request, and present in response to the audio playback request an audio recording of an interaction with the furnishing. Wherein the audio recording conveys a material composition of the furnishing.

DETAILED DESCRIPTION

Figure 1:
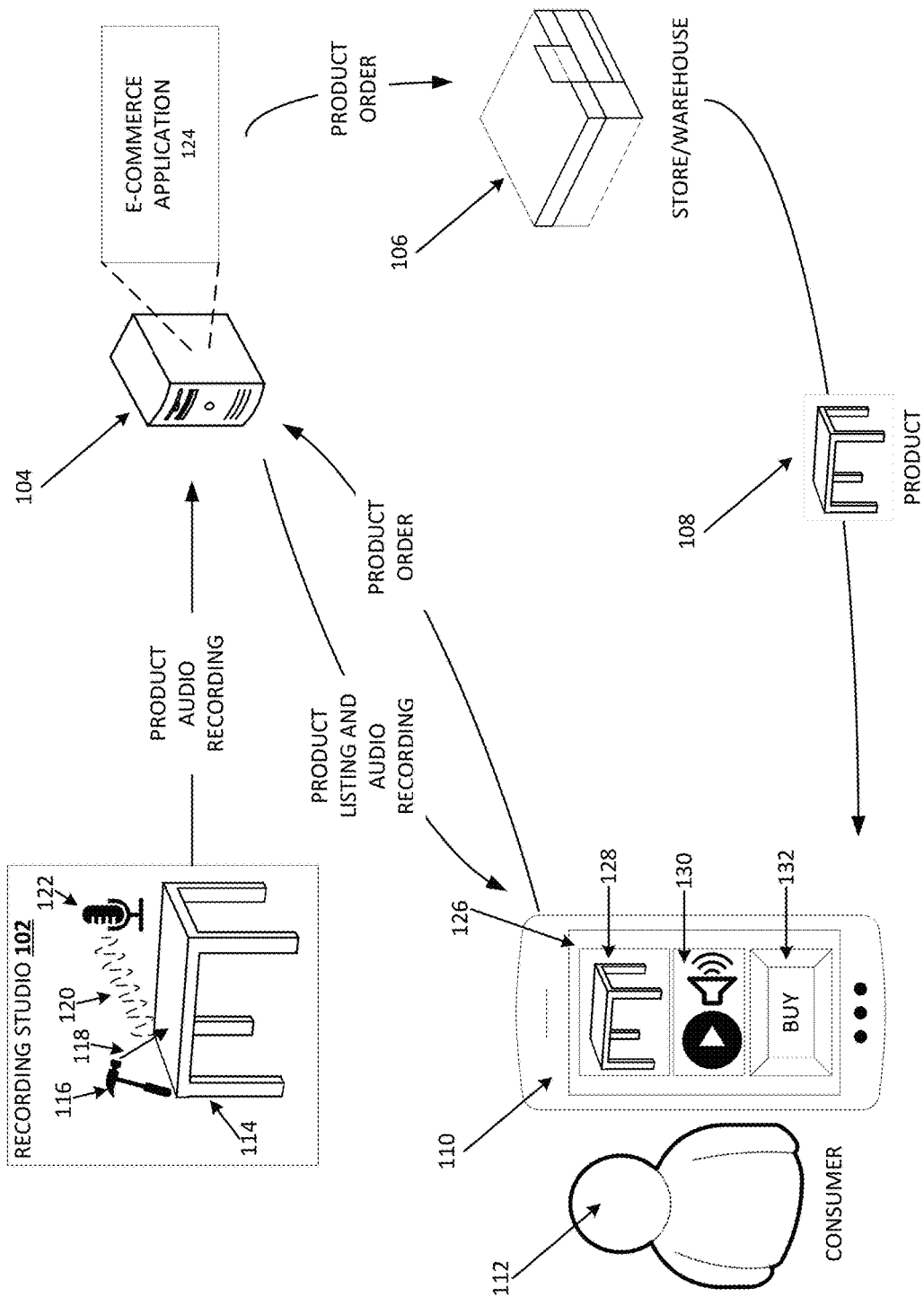
FIG. 1 is a schematic diagram illustrating an example product quality inspection system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example product quality inspection system 100. In this example, the product quality inspection system 100 includes a recording studio 102, a server 104, a store/warehouse 106, a product 108, a consumer computing device 110, and a consumer 112. The recording studio 102 includes a test product 114 an interaction object 116, an interaction method 118, an interaction sound 120, and a recording device 122. The server 104 includes an e-commerce application 124. The consumer computing device 110 includes a product quality conveyance application 126. The product quality conveyance application 126 includes a product viewer 128, an interaction sound controller 130, and a product purchaser 132.

In the example shown, the product quality inspection system 100 includes a recording studio 102. The recording studio 102 can include a test product 114, an interaction object 116, an interaction method 118, an interaction sound 120, and a recording device 122.

The test product 114 can be any type of product. In some examples the test product 114 a furnishing product. In some embodiments, many different products, or an entire catalog of products are be placed in the recording studio 102 so that the system can capture recording which conveys the material properties of the various products.

In some embodiments, the recording studio 102 is a room which is optimized to record one or more sounds capturing one or more interactions with the test product 114. Interacting with the test product 114 can include an interaction object 116 and an interaction method 118.

The interaction object 116 can be any object which is able to interact with the test product 114. In the example shown the interaction object 116 is a hammer. In other examples the interaction object 116 could be a hand, a finger, a foot, a rubber hammer, or a drumstick. In some examples, more than interaction object 116 is used.

The interaction method 118 is any interaction with a product. Examples of interaction method 118 include hitting, tapping, scratching, rubbing, and any other motion which makes sound with a material. In some examples multiple interaction methods 118 are recorded by the recording device 122.

The interaction object 116 and the interaction method 118 are used to interact with the test product 114. This interaction creates an interaction sound 120 which is received by the recording device 122.

The recording device 122 is a device which picks up audio. The recording device 122 can be positioned in the recording studio 102 to optimally pick up the sound from the interaction in order to convey a material property of the test product 114. One example of a recording device 122 is a microphone. In some examples, more than one audio recording device 122 is used.

Once the interactions are captured the one or more recordings are sent from the recording studio 102 to the server 104 through a network. The recordings can generated and stored in one of a variety of data formats, such as a lossy format (MP3, AAC, etc.), a loss-less format (FLAC, ALAC, etc.), or in an uncompressed format (WAW, AIFF, etc.). An example of the recording studio 102 is described and illustrated in FIG. 2. An example method for recording an interaction is described in FIG. 3.

The server 104 can be one or more severs containing one or more processors and one or more storage mediums. The server 104 includes an e-commerce application 124. The server 104 is connected to a network. In some examples, the network is a public network such as the internet. The server 104 can receive one or more recordings from the recording studio 102.

The e-commerce application 124 sends one or more products and one or more associated audio recordings to a consumer computing device 110. Each of the one or more audio recordings can convey a material product quality of the associated product. The e-commerce application 124 can then receive an order placed by the consumer 112. In response to receiving a product order the e-commerce application 124 can send the order to a store/warehouse 106 which will complete the order. The server 104 is described in greater detail in FIG. 4.

The store/warehouse 106 is can be one or more stores/warehouses which operates with an e-commerce platform. The store/warehouse 106 receives an order form the server 104 and fulfils the order by sending the ordered product to the consumer 112.

The product 108 can be any type of product which is sold. In the example shown the product 108 is a table. In other examples, the product 108 can be any other type of furnishing.

The consumer computing device 110 is a computing device used by one or more consumers for online shopping. The consumer computing device 110 can be a computer, tablet, mobile phone, or any other type of computing device which can connect to the server 104 using a network. In some examples, the device 110 is configured for presenting an augmented reality (AR) or a virtual reality (VR) including the product 108. Also shown in FIG. 1 is a consumer 112 using the consumer computing device 110 to conduct online shopping.

In the example shown, the consumer computing device 110 includes a product quality conveyance application 126. The example product quality conveyance application 126 includes a product viewer 128, an interaction sound controller 130, and a product purchaser 132.

The product viewer 128 displays the product. In some examples, the consumer 112 selects the displayed product from a list of products or searches for the product. The product viewer 128 may also include additional modification options such as modifications to product size, color, or material.

The interaction sound controller 130 in some examples is a controller for playing an interaction sound. The interaction sound controller 130 can be configured to receive an audio playback request, which causes the consumer computing device 110 to play the interaction sound associated with the product. The interaction sound is a sound which captures an interaction with a product that conveys a material property of the product.

The product purchaser 132 allows the consumer 112 to select a product to purchase. When the consumer selects the product purchaser a checkout process can be imitated. In some examples the product purchaser 132 may add the product to a shopping cart where the user can complete the purchase.

Figure 2:
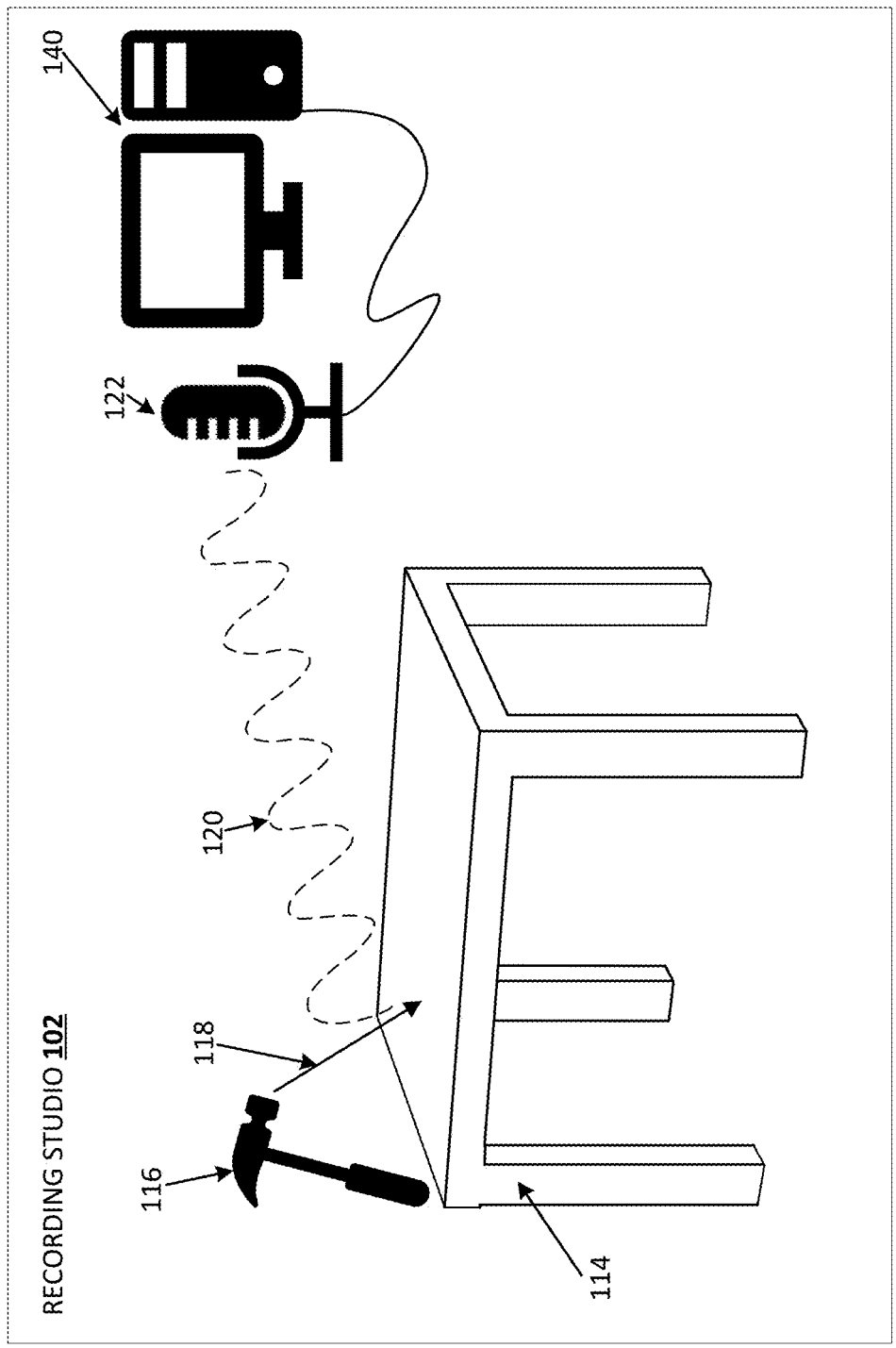
FIG. 2 is a schematic diagram illustrating an example recording studio.

FIG. 2 is a schematic diagram illustrating an example recording studio 102. The recording studio 102 is an example of the recording studio 102, as shown in the example of FIG. 1. The recording studio 102 includes a test product 114 an interaction object 116, an interaction method 118, an interaction sound 120, a recording device 122, and a computing device 140.

The recording studio 102 includes a test product 114. The test product 114 can be any product which is sold using e-commerce. In some examples, all products sold on an e-commerce platform include a test product 114 which is placed, interacted with, and recorded in a studio. In other examples, a few test products 114 are selected based on different material properties to capture a range of material properties. For example, one wood table is selected as test product 114. This test product can then be used to record the material properties for several related wood products which would have similar material properties.

The recording studio 102 can include an interaction object 116. The interaction object 116 can be any object which can interact with a product. Examples, of interaction objects 116 include a hand, a finger, a foot, a rubber hammer, a metal hammer, and a drumstick. In one example, a single interaction object 116 is used to interact with the test product 114. In other examples several different interaction objects 116 are used to capture different material properties of the test product 114. In some examples the test product 114 contains differ parts made of different materials. For example, the table may have a wood platform and metal legs.

The recording studio 102 can include an interaction method 118. Examples of interaction method 118 include hitting, tapping, scratching, rubbing, and any other motion which makes sound with a material. In some examples, one interaction method 118 is tested, such as tapping. In other examples, many different interaction methods 118 are tested. In some examples, the test product 114 contains surfaces with different materials and the interaction method can be applied to the different surfaces.

The recording studio 102 can include an interaction sound 120. An interaction sound 120 is created using the interaction object 116 and the interaction method 118 on the test product 114. The interaction sound 120 is based on the material composition properties of the test product 114. A test product 114 may have different material composition properties on different surfaces, the interaction sound 120 in such a case will be based recording the interaction with that surface.

The recording studio 102 includes a recording device 122. The recording device 122 can be one or more microphones. The recording device can be placed in such a manner to capture the interaction sound 120 and reduce noise.

The recording studio 102 can include a computing device 140. The computing device receives and processing the interaction sound 120 captured by the recording device 122. In some examples, the computing device is connected to a public network, such as the internet, and will upload information about the test product 114, the interaction object, interaction method, and the one or more captured sound recordings to a remote server.

Figure 3:
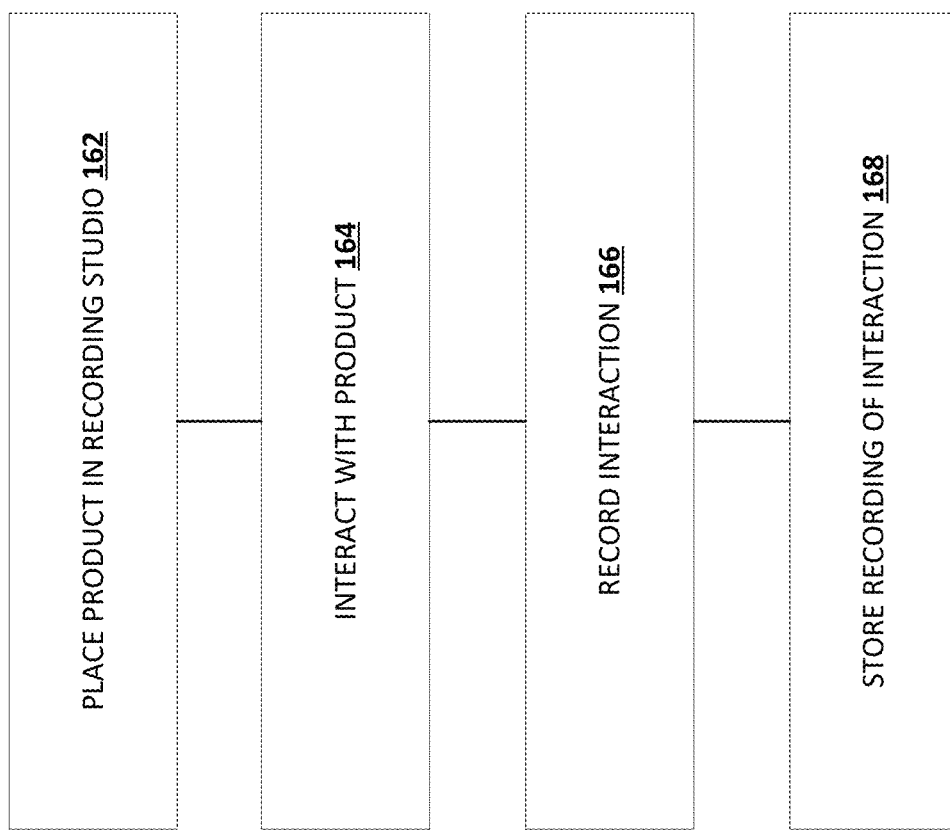
FIG. 3 is a flow chart illustrating an example method of recording an interaction with a product.

FIG. 3 is a flow chart illustrating an example method 160 of recording an interaction with a product. The method 160 can include the operations 162, 164, 166, and 168. In some examples, the method 160 is conducted in the recording studio 102 illustrated and described in reference to FIG. 2.

The operation 162 a test product is placed in a recording studio. FIG. 2 illustrates and describes an example of the test product and the recording studio. In some examples, the test products are different furnishings.

The operation 164 is an interaction with a test product. An interaction with a test product can include an interaction object and an interaction method. The purpose of interacting with the product is to create a sound which conveys a material property of the product. For example, tapping a piece of furniture may convey the quality and composition of the material.

The operation 166 the interaction is recorded. At this operation the interaction with the product creates a sound which is captured by a recording device. In some examples, many recordings of an interaction are captured and processed and selected either manually or automatically based on sound quality features.

The operation 168 the recording of the interaction is stored. The recording may be stored with tags or metadata based on the test product, the interaction object and method used. Tags or metadata can also include which surface was interacted with and with what force the interaction takes place.

The method 160 can be repeated with several times with the same test product to capture different interactions. The method 160 can also be repeated with a plurality of different products.

Figure 4:
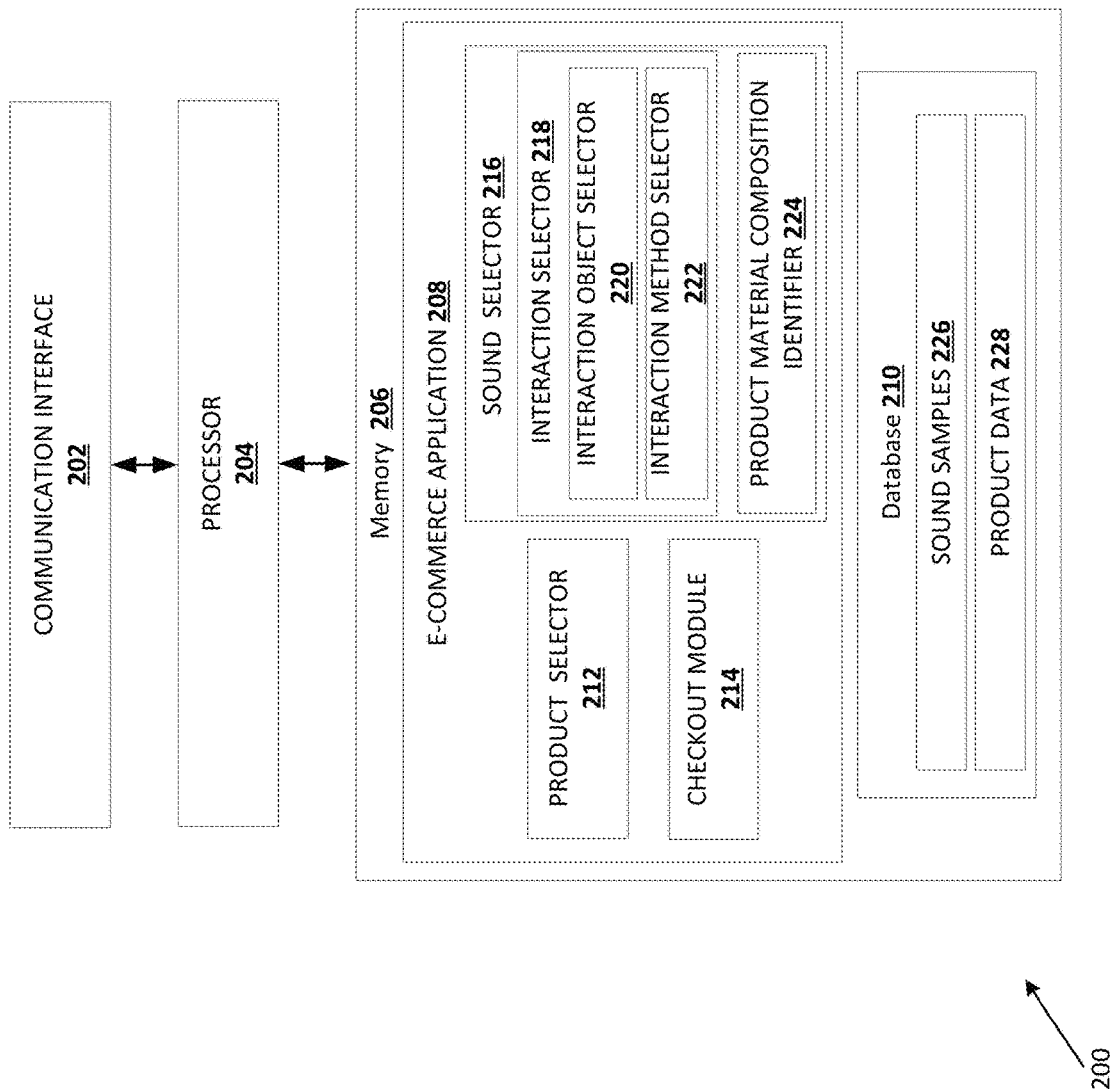
FIG. 4 is an example embodiment of a computing system.

FIG. 4 is an example embodiment of a computing system 200 usable with an e-commerce application. In some examples the computing system 200 is part of the server 104 as shown in FIG. 1. The computing system 200 includes a communication interface 202, a processor 204, and a memory 206. The memory 206 can include an e-commerce application 208 and a database 210. The e-commerce application 208 includes a product selector 212, a checkout module 214, and a sound selector 216. The sound selector 216 includes an interaction selector 218 and a product material composition identifier 224. The interaction selector 218 includes an interaction object selector 220 and interaction method selector 222. In some examples, the database 210 includes sound samples 226 and product data 228.

The computing system 200 can include a communication interface 202. Is used as an interface with a network. In some examples, the network is a public network such as the internet. The communication interface is configured to receive and transmit data, for example to access data in an external database, or to serve a web interface usable for an e-commerce application.

The computing system 200 can include a processor 204. The processor 204 can be any of a variety of types of programmable circuits capable of executing computer-readable instructions to perform various task, such as mathematical and communication tasks.

The computing system 200 can include a memory 206. The memory 206 can include any of a variety of memory devices, such as various types of computer-readable or computer storage media. The memory 206 can include an e-commerce application 208 and a database 210.

The memory 206 can include an e-commerce application 208. The e-commerce application 208 can be a web application which allows a plurality of users to online shop. The e-commerce application includes a product selector 212, a checkout module 214, and a sound selector 216.

In some examples, the e-commerce application 208 includes a product selector 212. The product selector is configured to provide an e-commerce user interface to a user which allows the user to select one or more products from an e-commerce catalog. In some examples the product selector 212 includes a catalog of products from a single related store. In other examples, the product selector 212 is part of an e-commerce platform for a verity of stores to sell products. The product selector can provide products using a list, a grid, a search engine, and many other methods which allow for the presentation of products in an e-commerce application.

In some examples, the e-commerce application 208 includes a checkout module 214. The checkout module allows the user to confirm the selection of one or more products and completes the purchase of the product. Completing the purchase of the product can include processing payment and shipping information for the consumer and placing an order for delivery or pick up of the one or more selected products. In some examples, the selected products are placed in a shopping bag which the consumer views and confirms before entering payment and shipping details.

In some examples, the e-commerce application 208 includes a sound selector 216. The sound selector 216 provides one or more audio samples associated with a product to a consumer. The sound selector 216 determines which audio samples to provide based on the displayed products and selections. The sound selector 216 can include an interaction selector 218 and a product material composition identifier 224.

Product material composition can be a component a consumer is interested in before purchasing a product. For example, crystal glass can have a different material quality than normal glass. In another example different wood types have different properties. These different properties can sometimes be perceived using sound. The product material composition identifier can assign a sound material property which represent how the product would sound in various interactions based on the real-world composition.

In some examples, the sound selector will select a sound based on the interaction selector 218 and product material composition identifier 224. In some examples, the interaction selector will provide a user interface which allows a consumer to make various selections and provide a sound sample based on those selections.

In some examples, the interaction selector 218 includes an interaction object selector 220. The interaction object selector 220 can provide a user interface allowing a user to select an object to interact with a product. In some examples, the interaction selector may provide a list or a selectable button to select a product. In other examples, a user can select an interaction object in a virtual reality system. Examples of interaction objects include a hand, a finger, a foot, a rubber hammer, a metal hammer, and a drumstick.

In some examples, the interaction selector 218 includes an interaction method selector 222. Interactions methods include hitting, tapping, scratching, kicking, rubbing, and any other motion which makes sound with a material. In some examples, the interaction method selector 222 will provide a user-interface which allows a customer to select an interaction method. In some examples, the user-interface is part of a web-application or a mobile application. In other examples, the user-interface may be part of a virtual reality system and the method is based on the users virtual interactions with the product.

The sound selector can include a product material composition identifier 224. In some examples, the product material composition identifier 224 is associated with a product. In other examples, one or more surfaces with different materials are associated with a product the material composition identifier 224 can provide the material composition for each surface and the sound selector will provide a sound sample based on the surface which is interacted with by the interaction method and interaction object.

In some examples, the material composition identifier 224 identifies a sound sample which is associated with a single product. For example, the material composition identifier may specifically identify sound samples which were recorded from the product selected by the consumer. In other examples, the material composition identifier 224 is generally related to a material property of a product. For example, a plurality of tables with a solid wood tops could be assigned the same material property. In other examples, a plurality of different types of furnishings with a similar material property of the products may correspond to the same material composition identifier 224. An example is tables and chest of drawers made out of the same type of material such as solid wood can share the same material composition identifier for the solid wood material.

The computing system 200 can also include a database 210. The database 210 can stores data related to the e-commerce application 208. In some examples the database contains sound samples 226 and product data 228.

In some examples the database 210 includes sound samples 226. The sound samples 226 include audio data which conveys a material property of a product. In some examples the sound samples 226 are uploaded from a recording studio like the recording studio illustrated and described in reference to FIG. 2. The sound samples can include a plurality of tags or metadata which describe the audio data in the sound sample 226. For examples the tags may identify that the sound sample is based on the test product, the interaction object and method used. Tags can also include information on which surface was interacted with and with what force the interaction takes place.

The database 210 can also include product data 228. Product data 228 includes any information about a product which is useful to a consumer. Product data 228 can include names of products, pictures of products, description of the products, price of the products, availability of the product, and many more examples of information which is helpful for presenting a product in an e-commerce application. Some products in the product data 228 may further comprise a pointer to a corresponding sound sample 226 or corresponding sound samples 226.

Figure 5:
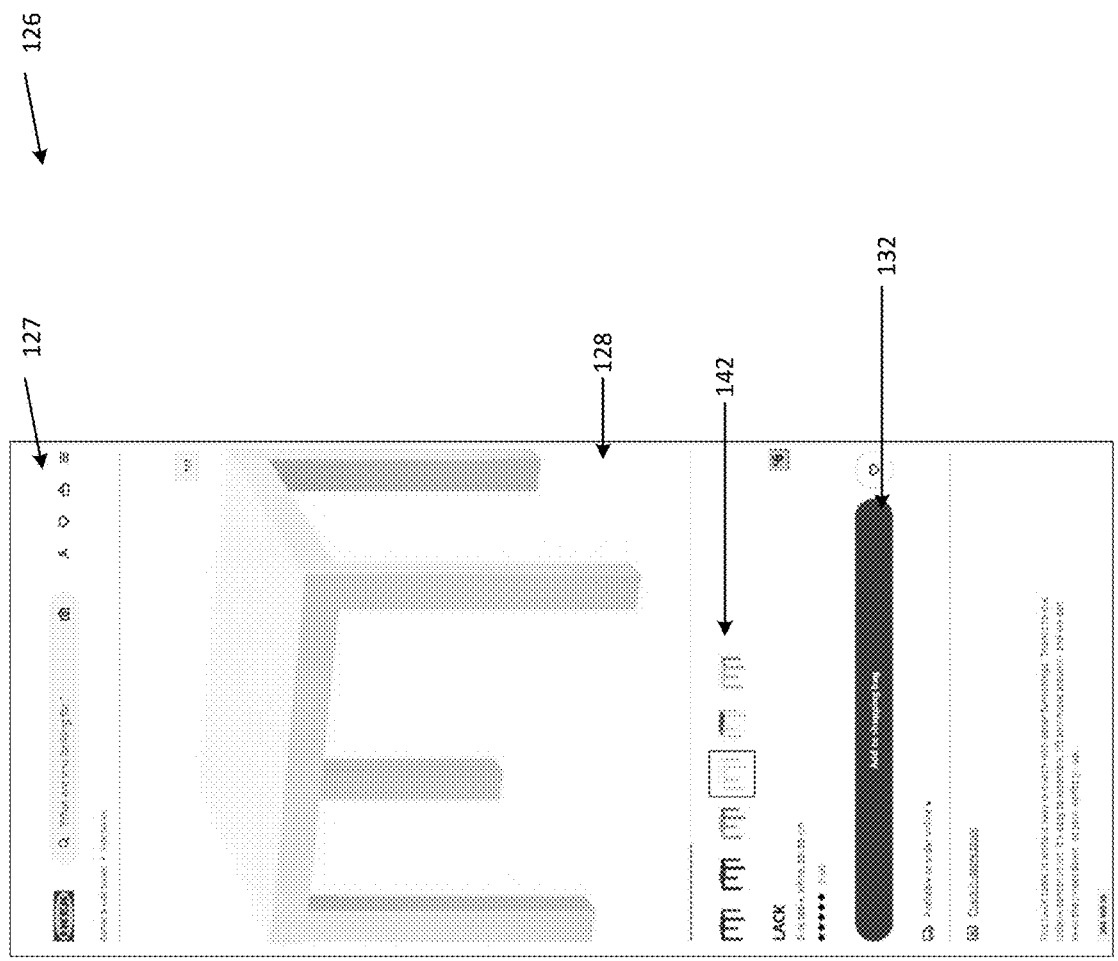
FIG. 5 is an example user-interface of the product quality conveyance application.

FIG. 5 is an example user-interface 127 of the product quality conveyance application 126. Another example of the product quality conveyance application 126 is illustrated and described in reference to FIG. 2. In some examples, the user-interface 127 includes a product viewer 128, a product purchaser 132, and product configuration selector 142.

In some examples the user-interface 127 includes a product viewer 128. In some examples the product viewer displays one or more pictures of a product. The product viewer may also include a name of the product. In other examples, the product viewer may be presented within a virtual reality system where the product is placed in a location or room.

In some examples the user-interface 127 a product purchaser 132. The product purchaser 132 allows a user to select a product to proceed with a purchasing process. In some examples, the product purchaser 132 places the product in a shopping chart which is involved in a checkout process.

In some examples the user-interface 127 includes a product configuration selector 142. The product configuration selector 142 may present a verity of different product configurations. Examples of product configurations include different colors, sizes, materials and any other configuration possible for a product.

Figure 6:
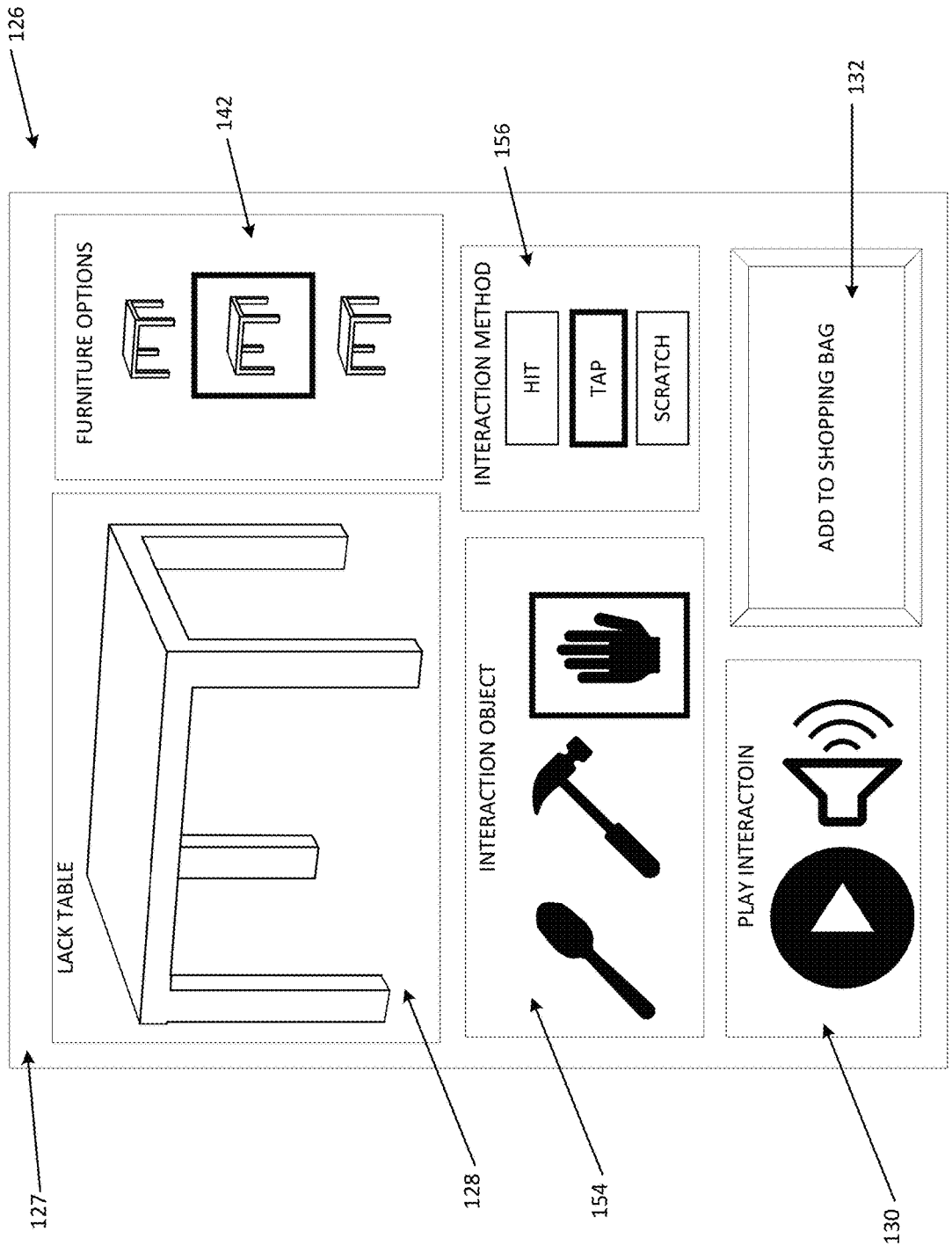
FIG. 6 is another example user-interface of a product quality convey application.

FIG. 6 is another example user-interface 127 of a product quality conveyance application 126. Another example of the product quality conveyance application 126 is illustrated and described in reference to FIG. 2. The user-interface includes a product viewer 128, an interaction sound controller 130, a product configuration selector 142, an interaction object selector 154, and an interaction method selector 156.

In some examples the user-interface 127 a product viewer 128. Is another example of the product viewer 128 described and illustrated in reference to FIG. 5. The product viewer 128 can display one or more products which a customer is interested in. The product viewer 128 can also display a product name other product information like description, price, and inventory.

In some examples the user-interface 127 includes an interaction sound controller 130. The sound controller is used to imitate playing an audio recording of an interaction. In the example show, the interaction sound controller 130 is a user actuated play button. In other examples, the interaction sound controller 130 may be included in the product viewer 128. For example, a user can select a surface of a product to interact with that surface. Interaction can for example be done by clicking a mouse, or tapping a touch screen. In other examples the interaction sound controller is part of a virtual reality system or augmented reality system, where the interaction can include moving a controller of the AR/VR system towards a digital representation of the product to interact with it. The sound played will relate to the product selected, the interaction object selected, and the interaction method selected.

In some examples the user-interface 127 a product configuration selector 142. The product configuration selector 142 is another example of the product configuration selector 142 illustrated and described in reference to FIG. 5. The product configuration selector 142 may present a verity of different product configurations. Examples of product configurations include different colors, sizes, materials and any other configuration possible for a product.

In some examples the user-interface 127 an interaction object selector 154. The interaction object selector 154 allows a user to select an object to interact with the product. In the example shown, the interaction object selector 154 includes three objects a spoon, a hammer, and a hand. In the example of the interaction object selected is a hand.

In some examples the user-interface 127 and an interaction method selector 156. The interaction method selector 156 allows a user to select an interaction method to interact with the product. In the example shown the interaction methods include hit, tap and scratch with tap being selected.

Figure 7:
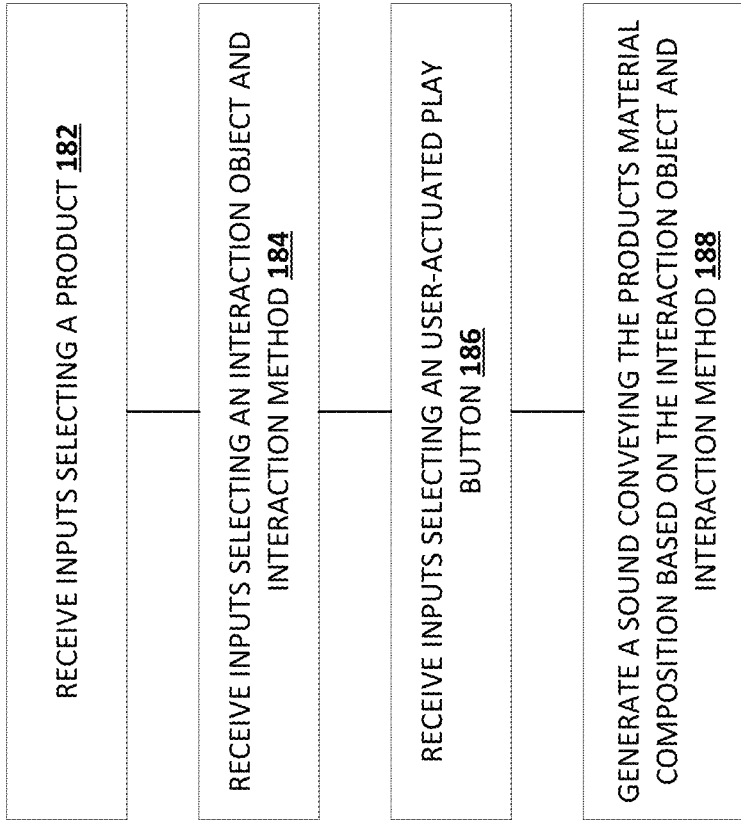
FIG. 7 is a flow chart illustrating an example method of conveying a material property of a product.

FIG. 7 is a flow chart illustrating an example method 180 of conveying a material property of a product. The method 180 can include the operations 182, 184, 186, and 188. The method 180 can be implanted with the product quality conveyance application 126 as shown in the examples of FIGS. 1 and 6. The method 180 can be implemented with the user-interface 127 as shown in the example of FIG. 6.

The operation 182 the method 180 receives inputs selecting a product. Selecting a product includes any of the many different ways a product is selected in an e-commerce system.

The operation 184 the method 180 receives inputs selecting an interaction object and interaction method. A user can select a specific interaction object and a specific interaction object.

The operation 186 the method 180 receives inputs selecting a user-actuated play button. In some examples the operation 186 is in response to the user selecting a surface or through some other user-interface method.

The operation 188 a sound is generated based on the material composition of the selected product, the interaction method, and the interaction object. For example, a sound sample will be selected from a database which relates to a wood table being tapped on by a hand when the table is selected as the product. The interaction object selected is a hand, and tapping is selected as the interaction method. A person of ordinary skill in the art would recognize that there are many different configurations to generate a sound which conveys the material composition of a selected product and these different configurations are included in the scope of this disclosure.

In some examples the sound generated at the operation 188 represents the physical state physical properties or material composition of the object. For example, if a user knocks with a spoon on a wooden desk the sound generated based on the physical real world properties of the wooden desk. These properties will be different if the wooden desk is solid wood or hollow wood.

Figure 8:
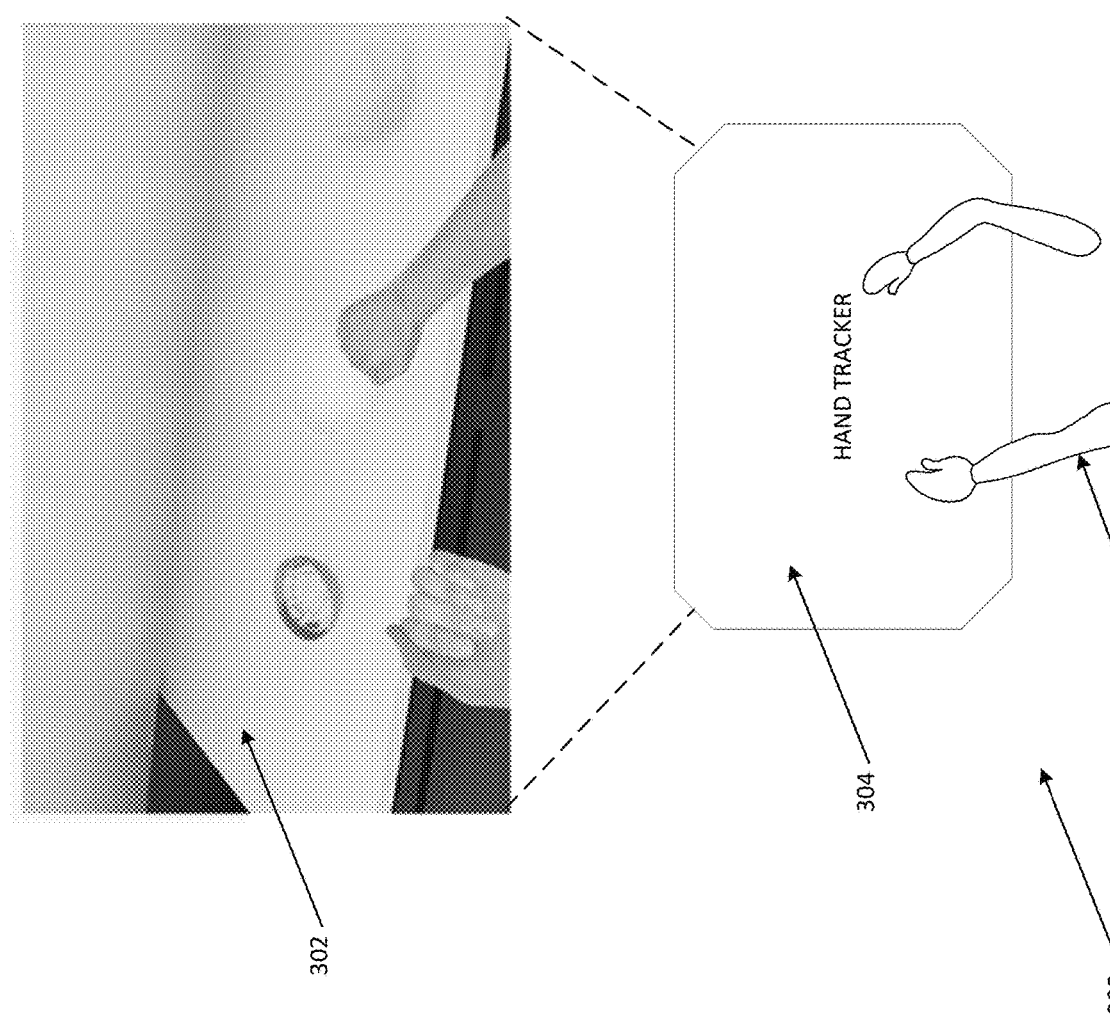
FIG. 8 is a virtual reality system of a product quality convey application.

FIG. 8 is a virtual reality system 300 of a product quality conveyance application 126. Another example of the product quality conveyance application 126 is illustrated and described in reference to FIG. 2. In some examples, the virtual reality system 300 includes a virtual reality display 302, a hand tracker 304 and a consumer 112.

The virtual reality system 300 can be any virtual or augmented reality system. In some embodiments the virtual reality system can include an Oculus® system. The virtual reality system 300 generates sounds based on the consumer 112 interacting with a virtual product. The virtual reality system 300 also works with an e-commerce web application which allows the consumer to purchase one or more of the products displayed in the application. In some examples, the virtual reality system 300 works with a furniture layout design system, which allows a user to place furnishing products in one or more rooms which a user can explore and interact with one or more of the furnishings. Such furniture layout design system can also be realized in a smart phone app, a web-application or desktop-application using 2D or 3D representations of the home and the selected furnishing products.

The virtual reality system 300 includes a virtual reality display 302. In some examples, the virtual reality display may be presented on a monitor. In other examples, the virtual reality display can be a mobile computing device, or a virtual reality headset. The virtual reality display can receive inputs from the hand tracker 304, to generate an image which includes a virtual representation of the consumer 112, as shown by the hands in the figure shown. The virtual reality display can also display one or more product which are being sold in an e-commerce application.

The virtual reality system 300 includes a hand tracker 304. In some examples the hand tracker may be a sensor which tracks a user's movements. In other examples, the hand tracker may be controllers containing sensors which track a user's movements. The hand tracker receives inputs and provides the movements to the product quality conveyance application.

The hand tracking can allow the customer to interact with products naturally as the consumer would in real life. In one embodiment disclosed these natural interactions are used to create sounds based on these movements. For example, if a user hits a virtual object with his tracked hand, he should hear a spatialized playback of a hand hitting that object in the correct distance and stereoscopic field so as to accurately represent the sound that the interaction would normally make. This can be extended to any natural method of interaction including touching, holding, hitting, scratching or any method that someone could naturally interact with any object using their hands.

The hand tracking can take into account hand velocity, point of contact with virtual object, and hand gesture. For example, the hand tracker can check if the hand is in a clenched fist, outstretched palm or single finger touching.

The virtual reality system 300 includes a consumer 112. The consumer 112 interacts with a virtual product which generates sounds based on these interactions. The consumer 112 can then purchase one or more products using the virtual reality system.

Figure 9:
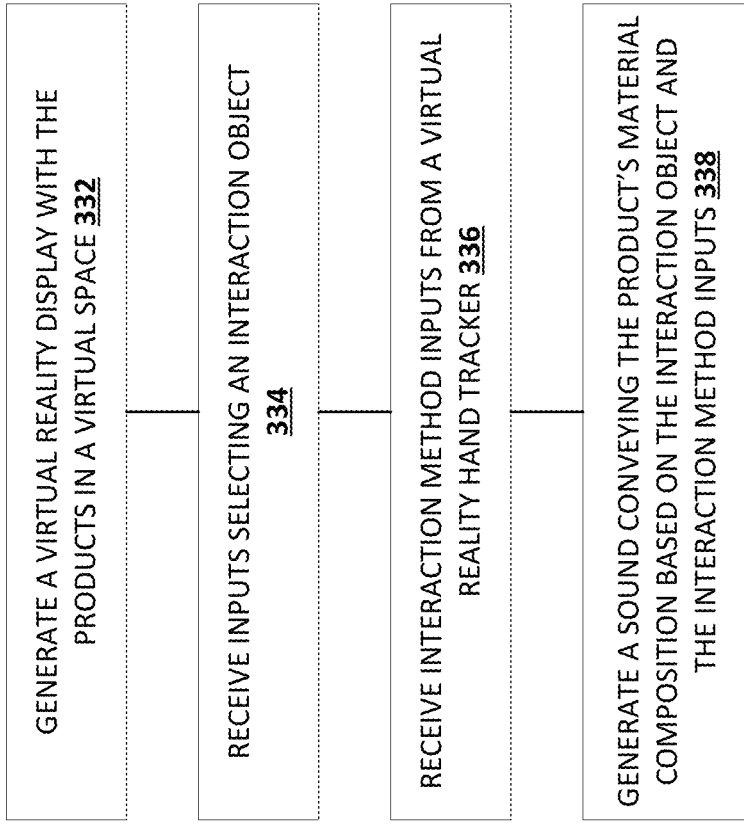
FIG. 9 is a flow chart illustrating an example method of online shopping.

FIG. 9 is a flow chart illustrating an example method 330 of online shopping. The method 330 includes the operations 332, 334, 336, and 338. The method 330 can be performed by the virtual reality system 300 described and illustrated in reference to FIG. 9.

In the operation 332, a virtual reality display is created with one or more products in a virtual space. In some examples, a consumer selects the products which are displayed. In other examples, the virtual space is an entire store which includes a catalog of products which a sure can interact with. In some examples, the virtual reality display is an augmented display which places the product in the space where the consumer is located. The display can be any simulated environment including augment reality, virtual reality, mixed reality or any other visually based medium.

The operation 334 the virtual reality system receives inputs selecting an interaction object. In some examples, the consumers virtual hands are the interaction objects. In other examples, the user selects a virtual interaction object in an interaction space, such as picking up a virtual drum stick from a virtual table.

The operation 336 interaction method inputs are received using a hand tracker. For example, the hand tracker may track a hand hitting the virtual product with a virtual drumstick. The hand tracker can track which surface is hit and with what force the product is hit.

The operation 338 a sound conveying a products material composition is generated based on the interaction object and the interaction method inputs. For example, the sound may be based on the movement tracked by the hand tracker, including which surface is interacted with, the type of motion, and the force of the motion.

Figure 10:
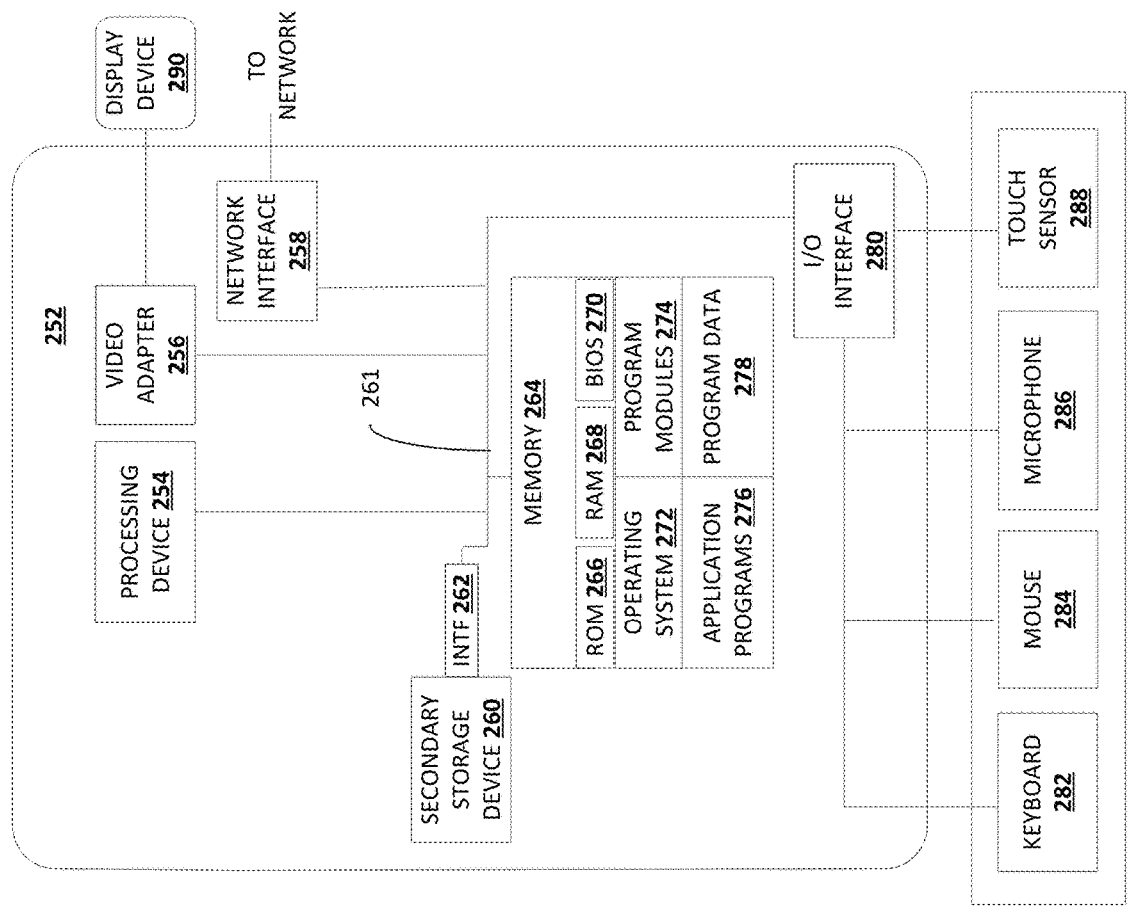
FIG. 10 illustrates an exemplary architecture of a computing device.

FIG. 10 illustrates an exemplary architecture of a computing device 252 that can be used to implement aspects of the present disclosure, including any of the plurality of computing devices described herein. The computing device 252 illustrated in FIG. 10 can be used to execute the operating system, application programs, and software described herein.

Examples of computing devices suitable for the computing device 252 include a desktop computer, a laptop computer, a tablet computer, a mobile computing device (such as a smartphone, an iPod® or iPad® mobile digital device, or other mobile devices), a computing device coupled with a kiosk, or other devices configured to process digital instructions.

The system memory 264 includes read only memory 266 and random access memory 268. A basic input/output system 270 containing the basic routines that act to transfer information within computing device 252, such as during start up, is typically stored in the read only memory 266.

The computing device 252 also includes a secondary storage device 260 in some embodiments, such as a hard disk drive, for storing digital data. The secondary storage device 260 is connected to the system bus 261 by a secondary storage interface 262. The secondary storage devices 260 and their associated computer readable media provide nonvolatile storage of computer readable instructions (including application programs and program modules), data structures, and other data for the computing device 252.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 260 or memory 264, including an operating system 272, one or more application programs 276, other program modules 274 (such as the software described herein), and program data 278. The computing device 252 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides input to the computing device 252 through one or more input devices. Examples of input devices include a keyboard 282, mouse 284, microphone 286, and touch sensor 288 (such as a touchpad or touch sensitive display). Other embodiments include other input devices. The input devices are often connected to the processing device 254 through an input/output interface 280 that is coupled to the system bus 261. These input devices can be connected by any number of input/output interfaces, such as a parallel port, serial port, game port, or a universal serial bus. Wireless communication between input devices and the interface is possible as well, and includes infrared, BLUETOOTH® wireless technology, 802.11a/b/g/n, cellular, or other radio frequency communication systems in some possible embodiments.

In this example embodiment, a display device 290, such as a monitor, liquid crystal display device, projector, or touch sensitive display device, is also connected to the system bus 261 via an interface, such as a video adapter 256. In addition to the display device 290, the computing device 252 can include various other peripheral devices (not shown), such as speakers or a printer.

When used in a local area networking environment or a wide area networking environment (such as the Internet), the computing device 252 is typically connected to the network through a network interface 258, such as an Ethernet interface. Other possible embodiments use other communication devices. For example, some embodiments of the computing device 252 include a modem for communicating across the network.

The computing device 252 typically includes at least some form of computer readable media. Computer readable media includes any available media that can be accessed by the computing device 252. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 252.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of conveying a quality of a furnishing with an e-commerce system, the method comprising:
   generating a user-interface presenting a listing for a furnishing at the e-commerce system, the user interface including a product viewer presenting the furnishing and an interaction object selector for selecting an interaction object from a plurality of interaction objects, wherein each of the plurality of interaction objects is an object usable to produce audio during an interaction with the furnishing;
   providing the user-interface to a computing device;
   receiving, via the user-interface at the computing device, an audio playback request including a surface selection input and an interaction object selection input, the surface selection input selecting a surface of the furnishing from the product viewer and the interaction object selection input selecting the interaction object from the interaction object selector determining an identifier associated with the selected surface of the furnishing;

retrieving, from a database of the e-commerce system, an audio recording conveying a material composition of the selected surface of the furnishing based at least in part on the identifier associated with the selected surface and the interaction object; and providing, in response to the audio playback request, the audio recording of an interaction with the furnishing to the computing device, wherein the audio recording is presented as audio output at the computing device.

2. The method of claim 1, wherein the interaction includes an interaction method.

3. The method of claim 1, wherein the interaction includes an interaction force.

4. The method of claim 1, wherein the audio playback request further includes:

generating a user-actuatable play element; and receiving an input selecting the user-actuatable play element.

5. The method of claim 1, the method further comprising:

presenting a plurality of material composition options for the furnishing; and receiving inputs selecting one of the plurality of material composition options, wherein the material composition of the selected surface of the furnishing is further based on the selected material composition option.

6. The method of claim 1, the method further comprising:

receiving inputs initiating a checkout process to purchase the furnishing.

7. The method of claim 1, wherein the audio playback request is received using one or more sensors which track a user's movement.

8. The method of claim 7, wherein the one or more sensors are part of a hand tracker controller.

9. A method of online shopping, the method comprising:

receiving, at a computing device, an e-commerce user-interface of an e-commerce system including an identification of a furnishing and an audio playback user actuatable element;

receiving, via the e-commerce user interface at the computing device, an interaction object selection input selecting an interaction object from a plurality of interaction objects, wherein each of the plurality of interaction objects is an object usable to produce audio during an interaction with the furnishing;

receiving, via the e-commerce user interface at the computing device, a surface selection input selecting a surface of the furnishing, wherein an identifier associated with the selected surface of the furnishing is determined;

selecting, via the e-commerce user-interface at the computing device, the audio playback user actuatable element;

receiving, at the computing device an audio recording of an interaction with the furnishing, the audio recording conveying a material composition of the selected surface of the furnishing, wherein the e-commerce system retrieves the audio recording from a database based at least in part on the identifier associated with the selected surface of the furnishing and the interaction object; and playing the audio recording as audio output at the computing device.

10. The method of claim 9, the method further comprising:

selecting an interaction method, wherein the audio recording further conveys the selected interaction method.

11. The method of claim 9, the method further comprising:

selecting an interaction force, wherein the audio recording further conveys the selected interaction force.

12. The method of claim 9, the method further comprising:

receiving inputs initiating a checkout process to purchase the furnishing.

13. An e-commerce system comprising:

one or more processors; and one or more memory storage devices, the one or more memory storage devices storing instructions that, when executed by the one or more processors, cause the e-commerce system to:

generate a user-interface to present a listing for a furnishing, wherein the user-interface includes a product viewer presenting the furnishing and an interaction object selector for selecting an interaction object, and wherein the interaction object selected with the interaction object selector is an object usable to produce audio during an interaction with the furnishing;

provide the user-interface to a computing device;

receive, via the user-interface at the computing device, an audio playback request including a surface selection input from the product viewer and an interaction object selection input from the interaction object selector, wherein the surface selection input selects a surface of the furnishing and the interaction object selection input selects the interaction object;

determine an identifier associated with the selected surface of the furnishing;

retrieve, from a database of the e-commerce system, an audio recording conveying a material composition of the selected surface of the furnishing based at least in part on the identifier associated with the selected surface and the interaction object; and provide, in response to the audio playback request, the audio recording of an interaction with the furnishing to the computing device, wherein the audio recording is presented as audio output at the computing device.

14. The e-commerce system of claim 13, wherein the instructions when executed by the one or more processors further cause the e-commerce system to:

receive a selection of an interaction method, wherein the audio recording corresponds with the selected interaction method.

15. The e-commerce system of claim 13, wherein the instructions when executed by the one or more processors further cause the e-commerce system to:

receive a selection of an interaction force, wherein the audio recording corresponds with the selected interaction force.

16. The e-commerce system of claim 13, wherein the audio playback request further includes to:

generate a user-actuatable play element; and receive an input selecting the user-actuatable play element.

17. The e-commerce system of claim 13, wherein the instructions when executed by the one or more processors further cause the e-commerce system to:
- present a plurality of material composition options for the furnishing; and
- receive inputs to select one of the plurality of material composition options, wherein the material composition of the selected surface of the furnishing is further based on the selected material composition option.

18. The e-commerce system of claim 13, wherein the instructions when executed by the one or more processors further cause the e-commerce system to:
- receive inputs initiating a checkout process to purchase the furnishing; and
- complete the checkout process.

19. The e-commerce system of claim 13, wherein the audio recording is produced by recording an interaction with an example furnishing in a recording studio.

* * * * *